United States Patent [19]
Cartwright

[11] Patent Number: 5,330,019
[45] Date of Patent: Jul. 19, 1994

[54] TRACK VEHICLE

[75] Inventor: Richard D. Cartwright, Beaverton, Oreg.

[73] Assignee: II-Tracker, Inc., Aloha, Oreg.

[21] Appl. No.: 58,471

[22] Filed: May 6, 1993

[51] Int. Cl.[5] .................................. B62D 55/04
[52] U.S. Cl. ........................ 180/9.21; 180/9.26; 305/51
[58] Field of Search ............ 180/9.1, 9.21, 9.23, 180/9.25, 9.26; 305/35 R, 35 EB, 39, 51, 54

[56] References Cited

U.S. PATENT DOCUMENTS

| | | | |
|---|---|---|---|
| D. 298,018 | 10/1988 | Cartwright | D12/3 |
| 3,390,924 | 7/1968 | Bumbaugh | 305/54 X |
| 3,958,839 | 5/1976 | Nodwell | 305/35 R |
| 4,328,849 | 5/1982 | Dighe et al. | 305/54 X |
| 4,351,380 | 9/1982 | Pilliod, Jr. et al. | 305/54 X |
| 4,635,740 | 1/1987 | Krueger et al. | 180/9.26 X |
| 4,938,546 | 7/1990 | Simmons | 305/39 X |

FOREIGN PATENT DOCUMENTS 4209205  7/1992  Japan .................................. 305/54

Primary Examiner—Margaret A. Focarino
Assistant Examiner—Victor E. Johnson
Attorney, Agent, or Firm—Kolisch, Hartwell, Dickinson, McCormack & Heuser

[57] ABSTRACT

A towing vehicle having power-driven entered rear drive wheels. A towed attachment frame with lateral trailing wheels is coupled to the towing vehicle. A continuous belt on each side of the vehicle is trained over a drive wheel and a trailing wheel. A row of cleat structures is secured to the outer surface of a belt. A cleat structure includes a central expanse and elongate extension sections extending outwardly from opposite ends of a central section. Extension sections protrude beyond opposite lateral margins of a belt. A cleat structure includes an element plastic clear body, and spline elements secured by fasteners to a belt clamp against shoulders in a cleat body to hold it in place.

7 Claims, 4 Drawing Sheets

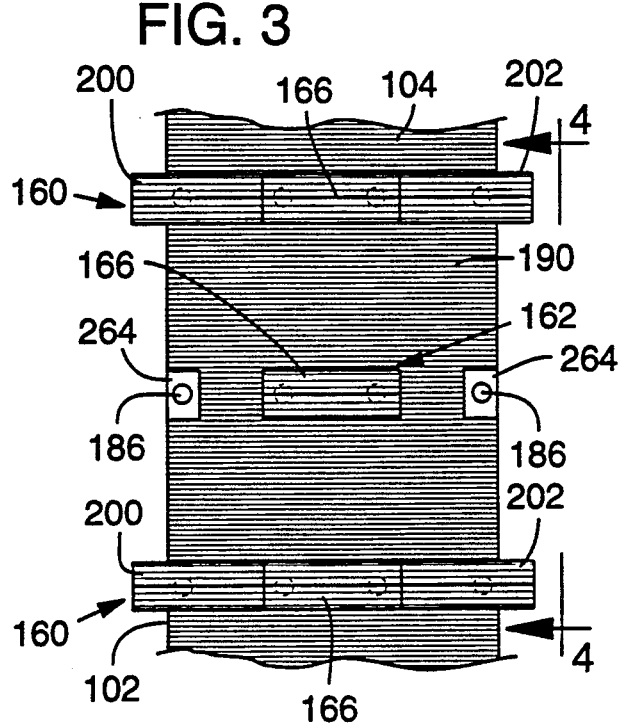
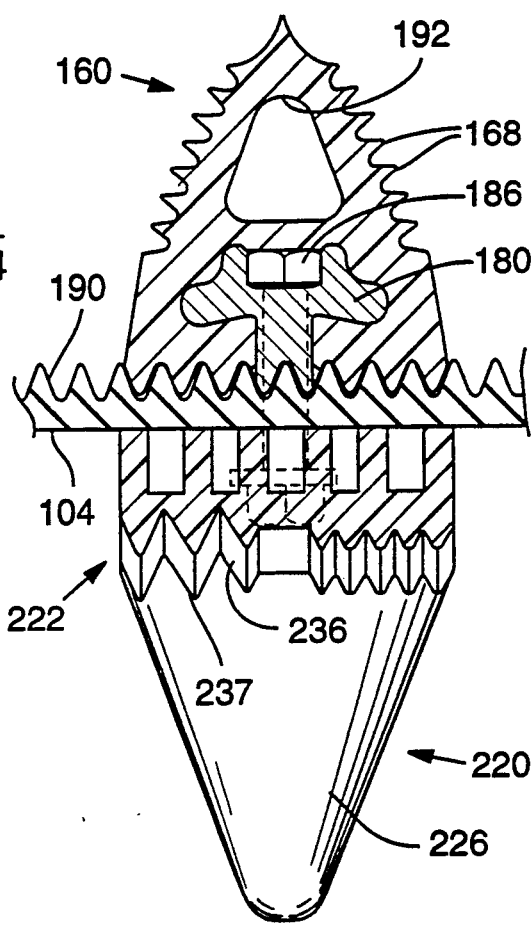
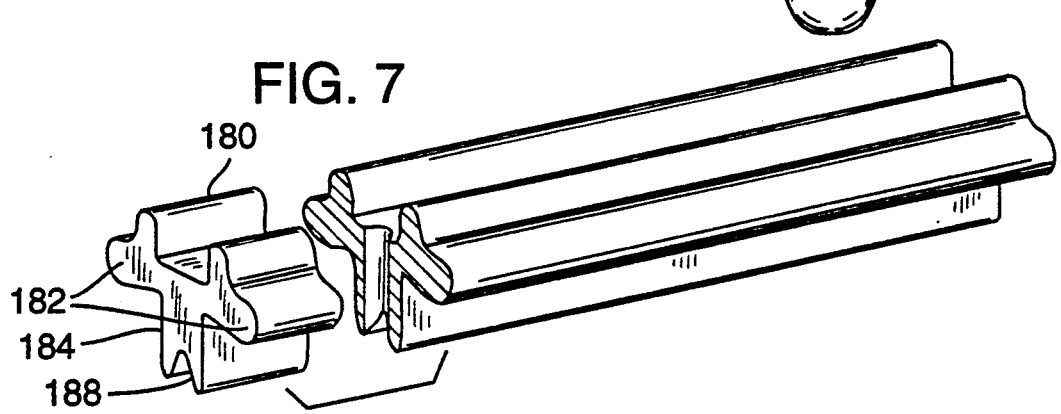

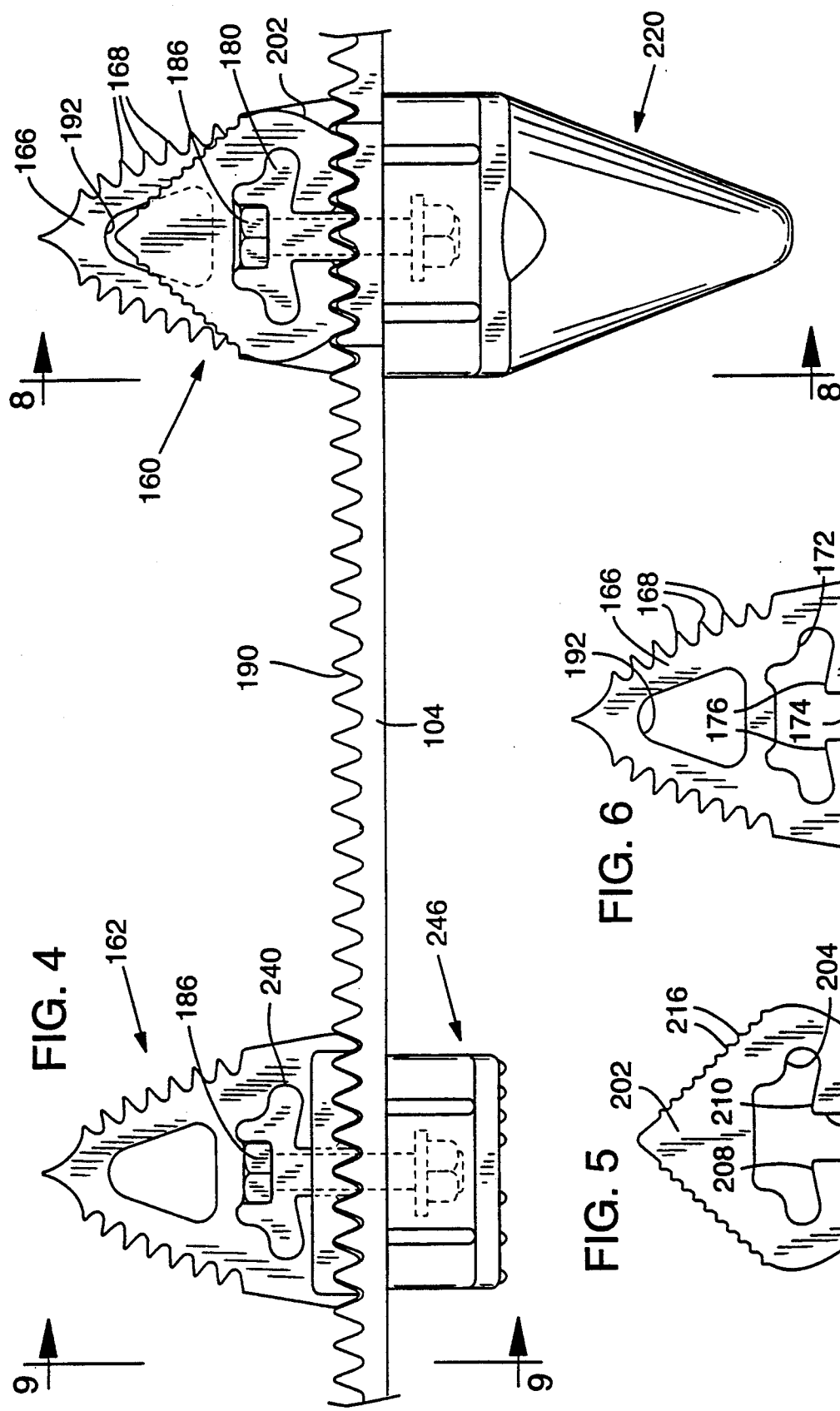

TRACK VEHICLE

BACKGROUND OF THE INVENTION

This invention relates to a track vehicle, and more particularly to a track vehicle which includes an elongate continuous crawler track trained over a pair of wheels, with the track on powered movement serving to propel the vehicle over the ground. A particular and preferred embodiment of the invention, as herein disclosed, is produced by coupling a crawler track attachment to the rear of an all-terrain vehicle, with the attachment having a frame towed by the all-terrain vehicle, and wheels on opposite sides of the frame training crawler tracks that couple the wheels of the attachment with the power-driven wheels of the all-terrain vehicle.

So-called all-terrain vehicles are a popular type of vehicle used by hunters, recreationalists, etc. to provide transport over rough roads, and terrain where roads are nonexistent. The vehicles are relatively compact, and in the usual instance include a pair of power-driven rear wheels suitable mounted at the rear end of a motorcycle-type frame, where the operator sits on a seat with legs straddling a compartment where a motor and controls for powering the vehicle are located.

Following the invention, a vehicle of the type described is transformed into a truly all-terrain vehicle by including crawler tracks trained over rear wheels in the vehicle and also idler wheels trailed behind the vehicle. If desired, a crawler track may also be included encircling the front wheels of the vehicle. The crawler tracks feature a novel construction for cleat structures embodied in the tracks, which provide the necessary traction for propelling the vehicle.

The vehicle contemplated has significantly greater pulling power than a conventional all-terrain vehicle. The vehicle is supported by a track system with enhanced ability to travel over the ground and float rather than sink into the terrain. The vehicle is versatile, in that it can travel over soft, mushy surfaces, snow and other non-surfaced areas, as well as on pavement. The vehicle, therefore, is well-suited, and provides a low cost alternative to other vehicles, for such uses as logging, firefighting, mining, spraying, ski resort use such as grooming, and uses requiring moving over bogs or soft tundra.

The invention also particularly concerns novel cleat structures provided on the outer surfaces of track belts in the construction, as well as a unique construction for tire guide elements mounted on inner belt surfaces for guided movement over wheels in the vehicle. The construction contemplated provides excellent traction, enhanced gripping action with softer terrain, good roadability and steerability with harder terrain surfaces, long life and low maintenance in cleat structures used, and ease of repair and replacement of a cleat structure in the event such is needed.

Various other objects and advantages are attained by the invention, which is described hereinbelow in conjunction with the accompanying drawings, wherein:

BRIEF DESCRIPTION OF THE DRAWINGS

FIG. 3 is a view, taken generally along the line 3—3 in FIG. 1, illustrating the face of a crawler track;

FIG. 4 is a view, on a somewhat enlarged scale, taken generally along the line 4—4 in FIG. 3;

FIG. 5 is an end view of one form of cleat body;

FIG. 6 is an end view of another form of cleat body;

FIG. 7 is a perspective view of a spline element;

FIG. 10 is a cross-sectional view taken along the line 10—10 in FIG. 8.

DETAILED DESCRIPTION OF THE PREFERRED EMBODIMENT

Figure 1:
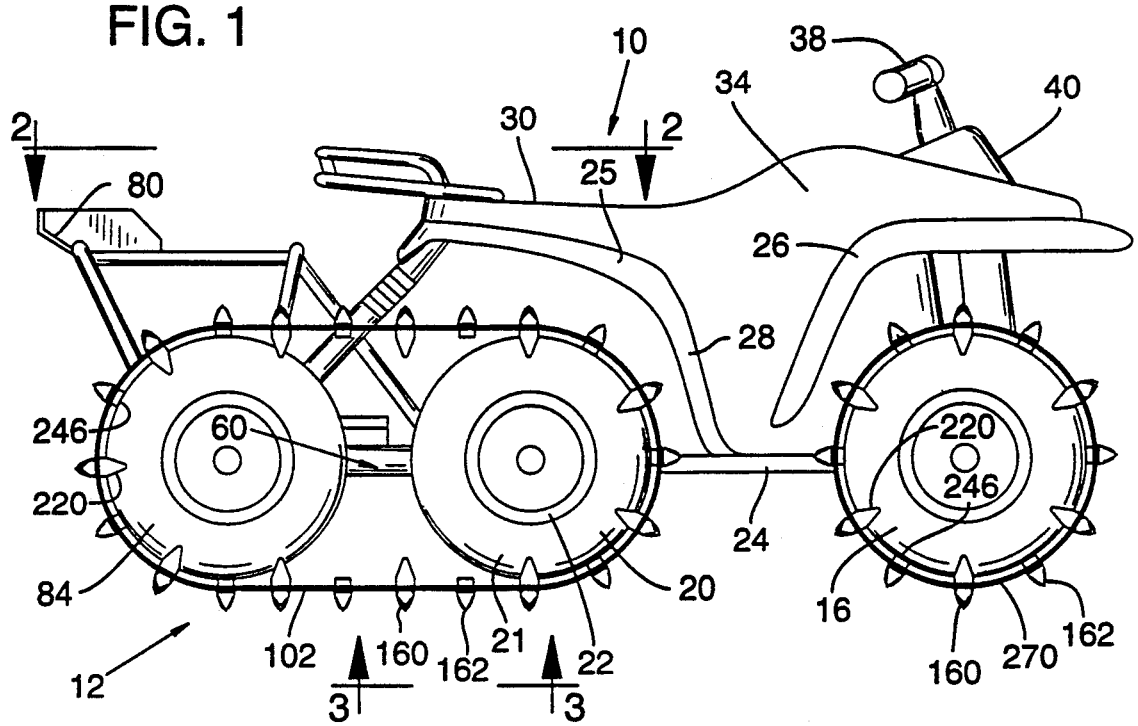
FIG. 1 is a side view of a vehicle with crawler tracks as contemplated herein.

Referring now to the drawings, and more particularly to FIG. 1, the vehicle illustrated takes the form of a conventional all-terrain vehicle, designated at 10, with attachments made thereto including a trailing frame with track assemblage, indicated generally at 12. The all-terrain vehicle (ATV) includes a pair of front steerable wheels such as the one shown at 16, with one being located on each side of the vehicle. The ATV further includes a pair of rear wheels 20, with one of these located on either side of the vehicle.

The wheels of the ATV are each rubber-tired wheels, and each includes the usual pneumatic rubber tire as exemplified by tire 21 suitably mounted on a rim as exemplified by rim 22.

The ATV includes a vehicle frame 24, having the wheels described suspended thereunder. The vehicle further includes a vehicle body 25 properly mounted on the vehicle frame, including front and rear fenders such as those shown at 26 and 28. An operator seat is shown at 30. Below and somewhat forwardly of seat 30 is a motor compartment 34, which receives the usual motor and controls used in propelling the vehicle.

During use, the operator sits on seat 30 with his legs straddling compartment 34 and the motor mounted therein. Steering of the front wheels 16 is performed with turning of handle bar 38 supported at the upper extremity of a steering post assembly 40.

The ATV illustrated is a four wheel drive unit with all four wheels powered with operation the motor powering the vehicle. Power is transmitted to the rear wheels through a suitable differential housed within differential housing 46 (see FIG. 2) connecting the differential gearing to the rear wheels. Conventional transmission gearing (not shown) connects the ATV motor to front wheels 26.

Figure 2:
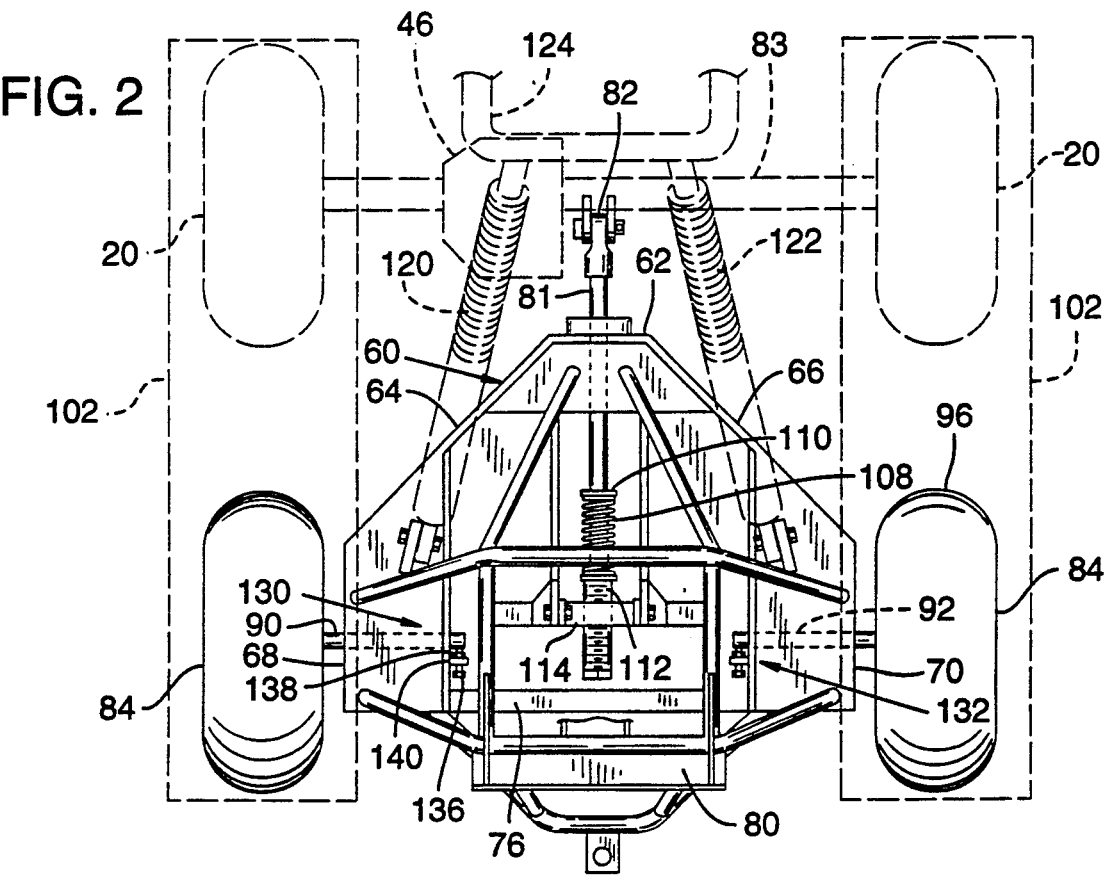
FIG. 2 is a view taken generally along the line 2—2 in FIG. 1, illustrating a so-called trailing frame present in the construction.
Figure 8:
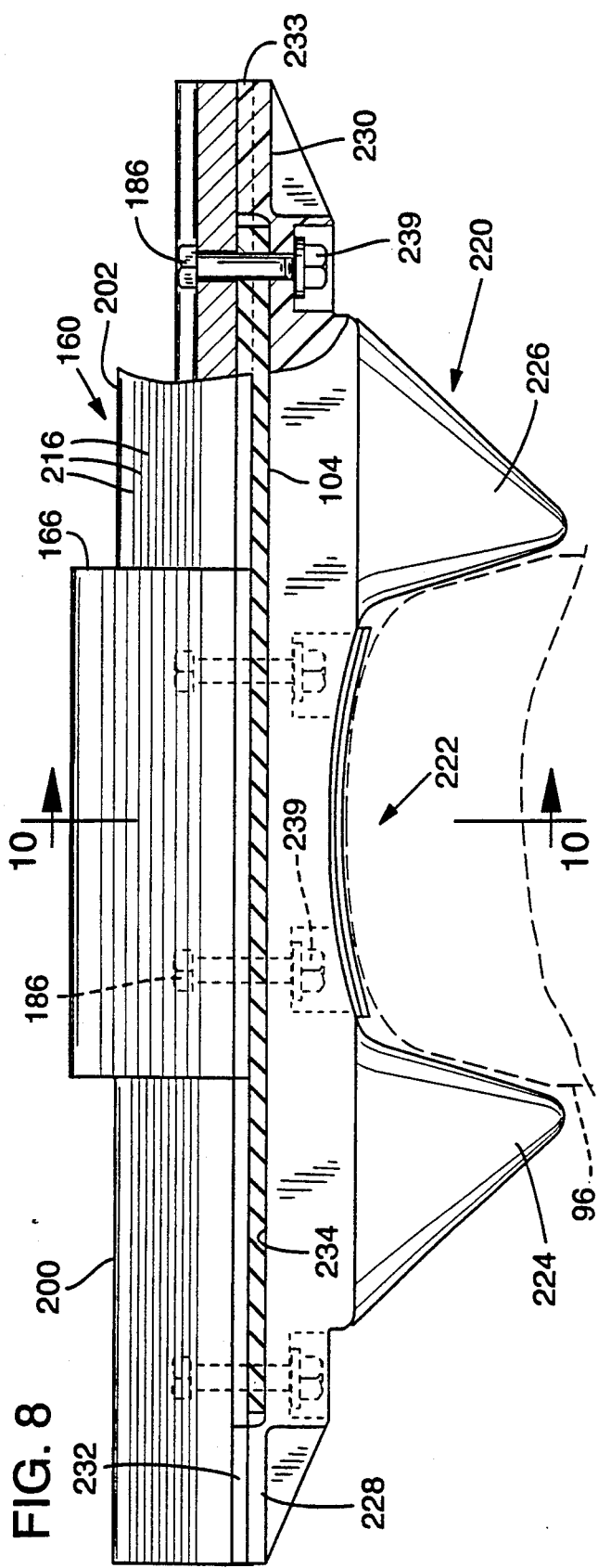
FIGS. 8 and 9 are cross-sectional views, taken generally along the lines 8—8 and 9—9 in FIG. 4.
Figure 9:
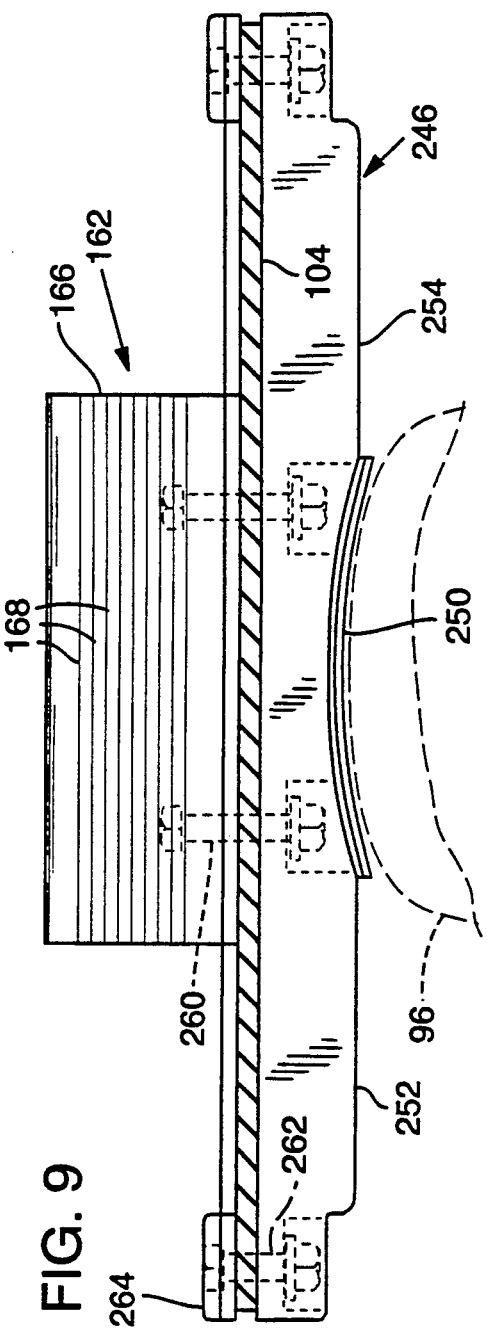

Considering now details of frame and track assemblage 12, and referring to FIGS. 1 and 2, what is referred to as a trailing or towed attachment frame is indicated at 60. Frame 60 includes a nose 62 with diverging frame sections 64, 66 extending rearwardly from this nose and joining with side frame elements 68, 70. Spanning the side frame elements is cross structure including a cross brace 76. If desired, a load carrying platform 80 may be provided which is part of the frame and carried at an elevated region at the rear of the ATV. The trailing frame is coupled by coupler 82 at the nose 62 of the frame coupling rod 81 to rear axle housing 83 of the ATV. The coupler affords a limited amount of swinging movement of the trailing portion of the trailing frame, up and down and from side to side with movement of the ATV over the ground.

Suitably supported on opposite sides of the trailing frame in positions tracking rear wheels 20 of the ATV are a pair of opposed lateral trailing wheels, or nonpowered idler wheels 84. Each wheel is rotatably supported on a stub axle, shown at 90 for wheel 84 at the left in FIG. 2 and shown at 92 for the trailing wheel at the opposite side of the vehicle. Each wheel, as in the case of the wheels on the ATV, includes a rim and a tire 96 supported on the rim, with the tire inflated by air under pressure.

An elongate, continuous elastomer belt 102 is trained over a wheel 20 on one side of the ATV and an idler wheel 84 which tracks it. Another belt 102 is trained over the other rear wheel of the vehicle and the idler wheel which tracks it. Each belt has a substantial width, which is to say a width which exceeds the width of the tires about which the belt is trained. Each belt has cleat structure to be described secured to the belt's outer side. Each belt and its cleat structure constitutes a crawler track.

Rod 81 carrying coupler 82 is mounted on the trailing frame for longitudinal movement of the rod relative to frame 60. Thus, shown at 108 is a coil compression spring which has one end seated against an abutment shoulder 110 secured to the rod. Hollow threaded element 112 having the rear end of rod 101 received within it is screwed into a threaded nut or follower 114 secured to frame 60. Spring 108 has its rear end abutting element 112. The spring exerts a bias on the trailing frame urging such rearwardly with respect to rod 81. This in effect urges rearward movement of the trailing frame relative to ATV frame 24, and this urged rearward movement tends to tension belts 102 trained about idler wheels 84. Element 112 is adjustable by turning it within the follower, to adjust the level of the biasing force exerted by the spring on the trailing frame.

Shock absorbers 120, 122 are provided on opposite sides of the trailing frame. These have bottom ends suitably anchored on the trailing frame. Upper ends are mounted on a bar 124 which is part of body 25 or the chassis of the ATV vehicle. The shock absorbers produce a balanced shock absorbing action on opposite sides of the trailing frame, and tend to maintain a level position of the frame as such is trailed behind the ATV vehicle.

An important part of the invention is the provision of adjustment mechanisms, shown at 130 and 132, for adjusting the angularity, i.e. attitude of axles 90, 92 supporting the idler wheels. Adjustment of the angularity of the axles, in effect, adjusts the angularity of the rotation axes of the idler wheels, with this adjustment being important in maintaining proper tracking of the belts over the idler wheels.

The adjustment mechanisms are similar. Describing with particularity mechanism 130 that adjusts axle 90, screw 136 passes through a threaded nut 138 secured to an ear 140 which is part of the trailing frame. The exposed end of the screw bears against a wear surface which is part of stub axle 90. With screw 136 advanced or retracted relative to nut 138, the position of axle 90 changes.

Referring now to FIGS. 3 through 9, important features of the present invention relate to the provision of novel cleat structures attached to the outer surface of a belt 102, establishing traction with the terrain over which the vehicle travels. Another important feature is the provision of novel so-called tire or wheel guides, which are secured at intervals to the inside of a belt, and serve to guide a belt as it travels onto a tire with movement of the vehicle. In the particular embodiment of the invention illustrated, a cleat structure on the outside surface of the belt is secured to a tire guide on the inside surface of the belt, and the guide and cleat structure are secured together with the belt sandwiched between the two.

Further explaining (and referring to FIG. 3), multiple cleat structures 160 interspersed with cleat structures 162 are disposed as a row on the outer surface of a belt, with the structures following one another along the length of the belt.

Considering details of a cleat structure 160 (and referring also to FIG. 6), disposed intermediate the ends of the structure, in a center region, is an elongate cleat body 166. Such ordinarily has a tough, stiff wear-resistant plastic composition, and a polyurethane material, by way of example, has been found highly satisfactory. The body may be an extruded element.

The cleat body in cross-section has an approximately A-shaped outline. Grip ridges 168 extend along the outside of the body. The base of the body is surfaced with alternating rib and grooves 170, 171. A mounting passage 172 extends along the interior of the body. Access slot or opening 174 connects passage 172 with the exterior of the body. Shoulders 176 are defined on opposite sides of passage 172.

A spline element or anchor plate 180 (now refer also to FIG. 7) secures the cleat body against the outer surface of the belt. The spline element has an approximately T-shaped cross-section. Elongate outer flanges 182 at opposite lateral margins in the element bear against shoulders 176. A center web 184 in the element extends through slot 174. Fasteners 186 extend downwardly through appropriate bores in this center web. The base of web 184 has a rib and groove surface 188.

The outer surface of the belt has a rib and groove surface 190, with the ribs and grooves in this surface extending transversely of the belt.

The plastic composition of the cleat body has sufficient yieldability to permit shoulders 176 to be flexed apart to enable placement of the upper portion of the spline element inside passage 172. When properly seated, the spline element and cleat body are drawn downwardly toward the outer surface of the belt with fasteners 186. Flanges 182 clamp against shoulders 176. Positive non-slip engagement with the grooved surface of the belt is provided by ribs and grooves 170, 171, and rib and groove surface 188.

A passage 192 is shown near the apex of the cleat body. By providing this passage, greater yieldability and flex is provided in the body than were the passage omitted.

With the cleat body mounted in place, the cleat body provides a central expanse in cleat structure 160. Mounted in a position extending beyond each end of cleat body 166 are cleat bodies 200, 202 (which may have the same plastic composition as body 166) forming end expanses or end sections in cleat structure 160.

Cleat bodies 200, 202 may have the same construction. As illustrated by body 202, each includes an internal passage 204 and an access slot 206, with shoulders 208, 210 presented on either side of the access slot. The cleat body has a rib and groove base 212. The outer surface of body 202 has a grip ridges 216.

End portions of spline element 180 securing body 166 in place secure bodies 200, 202 in place. As in the case of the center body 166, the rib and groove base described for bodies 200, 202 positively interfits with the ribs and grooves of the belt surface to firmly anchor the cleat bodies in place.

An elongate tire guide or tire guide element 220 (refer to FIGS. 4 and 8) extends on the under side of the belt opposite cleat structure 160. The tire guide is an integral molded plastic element, and may also have a polyurethane composition. The tire guide has a midregion 222, opposed approximately conical posts or pillars 224, 226 and end tabs 228, 230. Midregion 222, viewed from the side as in FIG. 8, has a slightly concave outline, whereby it better conforms to the curvature of the tire which the guide passes over. The posts are spaced apart a distance that slightly exceeds the width of the tire.

Referring to FIG. 10, grooves 236 separated by ridges 237 may be provided extending along the inner side of midregion 222, to increase the traction between the region and the tire. It has been found desirable to have the grooves and ridges of smaller height and lesser width adjacent that margin of the midregion which first moves onto a tire with movement of the belt (the right margin as viewed in FIG. 10), than along the opposite margin (the left margin in FIG. 10) where the grooves and ridges may be deeper and wider. Such an organization tends to result in less noise and smoother movement of the midregion onto the face of the rotating tire as the belt advances.

End tabs 228, 230 have ridges 232, 233 separated by grooves on their faces face 232. Furthermore, the end tabs are slightly offset forwardly from the level 234 of the tire guide where such extends between the tabs. With the tire guide mounted in place against the belt opposite cleat structure 160, the inside of the belt fits against level 234. The end tabs 228, 230 become positioned beyond opposite lateral margins of the belt and become positioned directly opposite end portions of cleat bodies 200, 202 that protrude beyond lateral margins of the belt. The groove and ridge surfaces on the end tabs interlock with the exposed ridges and grooves of cleat bodies 200, 202.

Fasteners 186 which secure a cleat body in place extend through the belt and through appropriate bores in the tire guide with ends then being secured in place with appropriate nuts.

Cleat structure 162 interspersed with cleat structures 160 has a substantially lesser length than cleat structure 160 (see FIG. 3). As illustrated, the cleat structure includes a single cleat body 166 secured in place in a position centered between opposite lateral margins of the belt. A spline element 240 (see FIG. 4) secures the cleat body in place, this element resembling spline element 180 but having lesser length, i.e. length which is only as long as the cleat body.

A tire guide 246 (see FIGS. 4 and 9) is provided opposite cleat structure 162. The tire guide has a midregion 250 and end portions 252, 254. Midregion 250 may be surfaced and have a curvature similar to the construction discussed in connection with midregion 222. The tire guide, however, need not have guide posts, with the posts on tire guides 220 providing a sufficient guiding function to render these unnecessary. The overall length of the tire guide is equal approximately to the width of the belt. Fasteners 260 securing the cleat body in place extend through belt 104 and into the tire guide 246. Additional fasteners 262 may be provided to secure the ends of the tire guide in place. With these fasteners, washer members 264 may be included for supporting the heads of the fasteners.

It will be noted that cleat body 166 making up the central expanse of cleat structure 160, and used in the construction of cleat structure 162, has a height which exceeds the height of cleat bodies 200, 202 (employed in the end extensions of a cleat structure 160). The higher cleat bodies are aligned in a row extending centrally of the belt. A crown effect is imparted to the belt by these higher cleat bodies, which makes for easier steering and lessened wear on hard surfaces where penetration is minimal. The overhang of alternate ones of the cleat structures, produced in the embodiment of the invention illustrated by end portions of cleat bodies 200, 202 which project beyond lateral margins of the belt, results in what sometimes is referred to as a block shear effect. This refers to the ability of such overhanging portions to penetrate deeply into soft terrain, with no belt back up in effect limiting the penetration. This is an important feature of the construction disclosed, in producing enhanced pulling power in soft terrain such as snow or mud bogs.

The front wheels of the vehicle combination are shown provided with front belts 270, extending about their perimeters. These belts do not track over separate wheels, and thus each snugly encompasses the wheel associated therewith with no movement into and out of engagement with the wheel. In other respects, the belts may have a construction similar to that of the belts provided at the rear of the vehicle.

Thus, each belt is shown provided with a row of cleat structure including cleat structures 160 interspersed with cleat structures 162. As in the case of the earlier described belts at the rear of the vehicle, each of the cleat structures is provided with a tire guide on the opposite side of the belt from the cleat structure. In the case of the cleat structure 160 the tire guide is as shown at 220 earlier described, and includes spaced apart posts. In the case of cleat structure 162, the tire guide is shorter and is devoid of any such post and resembles tire guide 246.

A track vehicle as disclosed has been found to be extremely versatile in operation and relatively maintenance free. The plastic cleat structures described are abrasion resistant, and are well-suited to withstand the scrubbing, scraping and other types of wear to which such structures are subjected. In the event that a cleat body needs to be replaced, it is a relatively easy matter to loosen the plate or spline element associated with the body, and with the spline element loosened to flex the body whereby it is freed from the spline element with the shoulders in the cleat body moved out and around the clamping ribs or flanges of the spline elements. Replacement of a cleat body with a new one is as easily performed.

A vehicle with the crawler tracks discussed is easily prepared as a conversion from a conventional all-terrain vehicle. The tracked all-terrain vehicle that results represents a relatively modest capital outlay in comparison with conventional track vehicles currently available.

While an embodiment of the invention has been described, it is obvious that modifications and variations are possible. It is intended to cover all such modifications and variations which come within the scope of the invention hereinafter set forth.

It is claimed and desired to secure by letters patent:
1. In a vehicle:
   a wheel and a belt trained over the wheel, the belt having opposite lateral margins;
   a row of multiple cleat structures with the cleat structures following one another along the length of the belt secured to the outer surface of the belt, the cleat structures establishing traction between the belt and terrain traveled over by the vehicle, the row of cleat structures including a first series of cleat structures and a second series of cleat structures and the cleat structures of the first series being interspersed with the cleat structures of the second series;

each cleat structure in said first and second series of cleat structures having a central expanse located intermediate the opposite lateral margins of the belt;

the cleat structures of the second series, at regular intervals along the length of the belt, including an extension section extending transversely of the belt and aligned with the central expanse in the cleat structure and protruding beyond one of said belt lateral margins, the cleat structures of the first series having opposite ends located inwardly of the opposite lateral margins of the belt; and the extension section having a height which is less than the height of the central expanse in the cleat structure.

2. The combination of claim 1, wherein the extension sections are disposed in a pair of rows, with one row of extension sections adjacent one lateral margin of the belt and the extension sections in this one row having end extremities projecting beyond the said one lateral margin of the belt, and another row of extension sections adjacent the opposite lateral margin of the belt and the extension sections in the other row having end extremities projecting beyond said other lateral margin of the belt, 3. The combination of claim 1, wherein the wheel is bounded by a tire, and wherein the cleat structures are secured to the outside of the belt, and which further includes a tire guide for said second series of said cleat structures, the tire guide being secured to the inside of the belt opposite the cleat structure associated therewith, the tire guide including a base extending the length of the guide, and a pair of molded opposed pillars integral with the base and adapted to straddle opposite sides of a tire.

4. The combination of claim 3, wherein a tire guide has end expanses located beyond opposite lateral margins of the belt and outwardly on the guide from said pillars, and wherein said end expanses of the tire guide engage the cleat structure associated therewith.

5. In a vehicle, the combination of:
a wheel bounded by a tire,
a belt trained over the tire and the belt having opposite lateral margins,
a cleat structure secured to the outer surface of the belt establishing traction between the belt and terrain traversed by the vehicle,
a tire guide secured to the inside surface of the belt opposite the cleat structure,
the tire guide and cleat structure both protruding beyond at least one of said lateral margins of the belt and the tire guide and cleat structure having mutually complimenting rib and groove surfaces interengaging each other where the tire guide and cleat structure protrude beyond the lateral margin of the belt.

6. In a vehicle, the combination of a wheel and a belt trained over the wheel,
an elongate cleat structure secured to the outer surface of the belt extending transversely of the belt and establishing traction with the terrain traveled by the vehicle, said cleat structure including an elongate spline element extending transversely of the belt and fasteners spaced along the length of the spline element securing the spline element to the belt, said spline element having elongate grip flanges extending longitudinally along opposite edges of the spline element spaced outwardly from the outer surface of the belt, said cleat structure further including an elongate cleat body secured by the spline element against the outer surface of the belt, and
said cleat body having a plastic composition and an internal passage extending longitudinally therealong receiving said spline element and having a pair of opposed shoulders separated by a space, said shoulders underlying and being gripped by said grip flanges and said space receiving said fasteners, said cleat body having a base disposed opposite the outer surface of the belt, the outer surface of the belt having ribs and grooves extending transversely of the belt and the base of said cleat body having ribs and grooves interfitting with the ribs and grooves of said belt.

7. In a vehicle, the combination of:
a wheel bounded by a tire having an outer periphery and opposite sides,
a belt trained over the tire having opposite lateral margins,
a cleat structure secured to the outer surface of the belt establishing traction between the belt and terrain traversed by the vehicle,
a tire guide secured to the inner surface of the belt opposite said cleat structure, said tire guide having a plastic composition and including a unitary base extending the length of the guide and across the outer periphery of the tire and a pair of molded opposed posts integral with the base and extending radially inwardly positioned so as to straddle opposite sides of the tire,
said tire guide having opposite ends disposed outwardly on the guide from said pillars and said ends of the guide being located outwardly of said margins of the belt, and
said cleat structure having ends disposed outwardly of said belt margins and said ends of said guide interengaging with said ends of said cleat structure.

* * * * *